(12) United States Patent
Fujita et al.

(10) Patent No.: US 8,607,440 B2
(45) Date of Patent: Dec. 17, 2013

(54) METHOD OF MANUFACTURING A THERMISTOR ELEMENT

(75) Inventors: Toshiaki Fujita, Naka (JP); Kazutaka Fujiwara, Naka (JP); Takashi Yamaguchi, Naka (JP)

(73) Assignee: Mitsubishi Materials Corporation, Tokyo (JP)

( * ) Notice: Subject to any disclaimer, the term of this patent is extended or adjusted under 35 U.S.C. 154(b) by 208 days.

(21) Appl. No.: 13/120,804

(22) PCT Filed: Jul. 27, 2009

(86) PCT No.: PCT/JP2009/003516
§ 371 (c)(1),
(2), (4) Date: Mar. 24, 2011

(87) PCT Pub. No.: WO2010/038342
PCT Pub. Date: Apr. 8, 2010

(65) Prior Publication Data
US 2011/0169601 A1    Jul. 14, 2011

(30) Foreign Application Priority Data
Oct. 3, 2008 (JP) ................. 2008-258742
Mar. 17, 2009 (JP) ................. 2009-064824

(51) Int. Cl.
*H01K 7/02* (2006.01)
*H01K 7/04* (2006.01)

(52) U.S. Cl.
USPC .............................................. 29/612; 29/593

(58) Field of Classification Search
USPC .............. 29/612, 593; 252/500, 518.1, 519.1, 252/519.2, 520.2, 520.5, 521.1
See application file for complete search history.

(56) References Cited

U.S. PATENT DOCUMENTS 4,200,970 A * 5/1980 Schonberger ................... 29/593
6,306,315 B1 * 10/2001 Ogata et al. ................ 252/518.1

FOREIGN PATENT DOCUMENTS

| JP | 3029388 A | 2/1991 |
| JP | 3084390 A | 4/1991 |
| JP | 5243006 | 9/1993 |
| JP | 7130504 A | 5/1995 |
| JP | 07-235405 | 9/1995 |

(Continued)

OTHER PUBLICATIONS

Notice of Refusal for corresponding Japanese Application No. 2009-064824.

(Continued)

*Primary Examiner* — Thiem Phan
(74) *Attorney, Agent, or Firm* — Edwards Wildman Palmer LLP; Jeffrey D. Hsi

(57) ABSTRACT

Disclosed is a manufacturing method for a thermistor element having a step wherein a thermistor raw material powder formed from a metal oxide, an organic binder powder, and a solvent are mixed and kneaded to form a clay, a step wherein the clay is extrusion-molded by means of a molding die to form a rod-shaped, green molded body having multiple through-holes, a step wherein the rod-shaped green molded body is dried to form a rod-shaped dried molded body, a step wherein the rod-shaped dried formed body is cut to a prescribed length to form a cut molded body having through-holes, and a step wherein lead wires are introduced into the through-holes of the cut molded body and firing is then performed to form a metal oxide sintered body for thermistor use from the cut molded body.

9 Claims, 9 Drawing Sheets

(a)

(b)

(56) References Cited

FOREIGN PATENT DOCUMENTS

| JP | 08-031621 | 2/1996 |
| JP | 11-008103 | 1/1999 |
| JP | 2000-012308 | 1/2000 |
| JP | 2007-116577 A | 5/2007 |

OTHER PUBLICATIONS

International Search Report for PCT/JP2009/003516.

* cited by examiner

FIG. 3
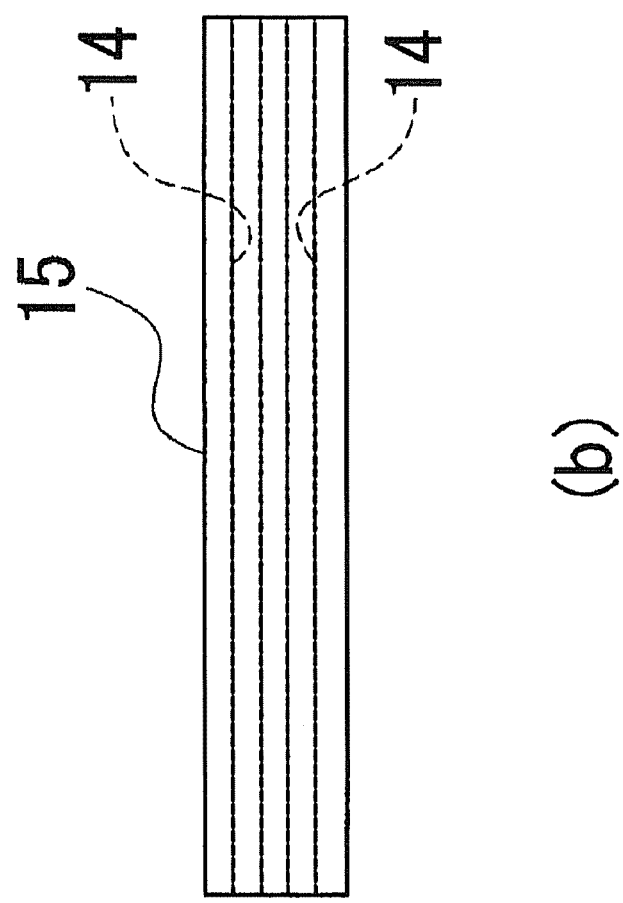
(b)
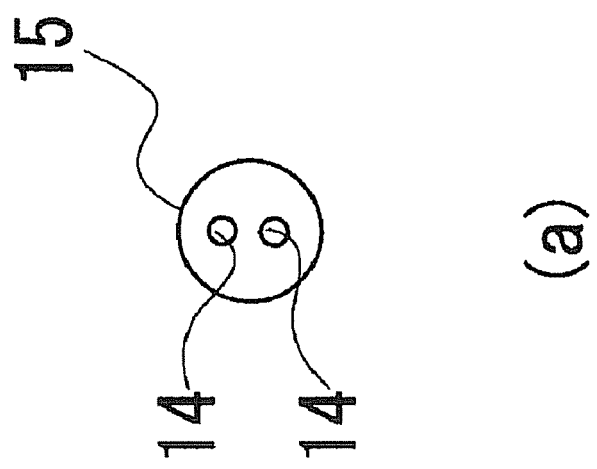
(a)

FIG. 4
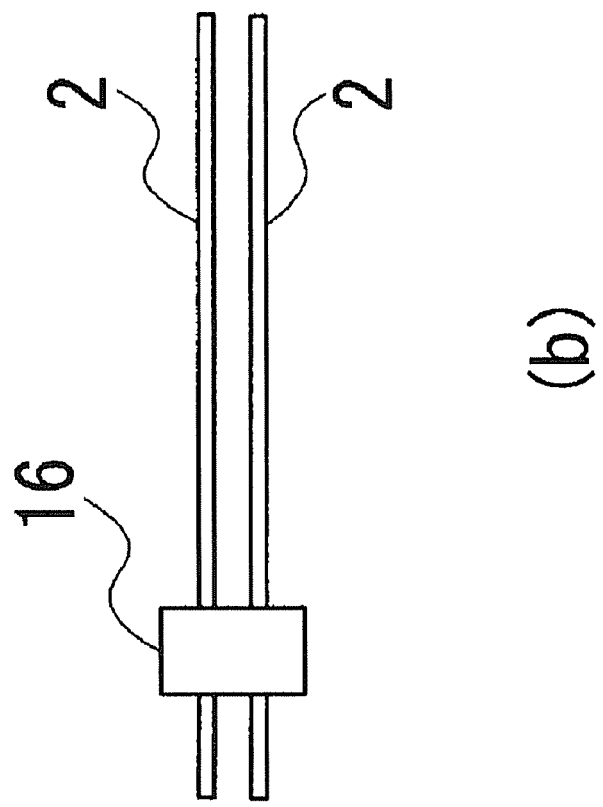
(b)
(a)

METHOD OF MANUFACTURING A THERMISTOR ELEMENT

CROSS-REFERENCE TO RELATED APPLICATIONS

This application is the national phase under 35 U.S.C. §371 of PCT International Application No. PCT/JP2009/003516, filed on Jul. 27, 2009, which claims priority of Japanese Application No. 2009-064824, filed Mar. 17, 2009 and Japanese Application No. 2008-258742, filed Oct. 3, 2008. The contents of each of these applications are incorporated herein by reference in their entirety.

TECHNICAL FIELD

The present invention relates to manufacturing method for a thermistor element used in temperature measurement in relation to an automobile or the like, and to a thermistor element.

BACKGROUND ART

Conventionally, a thermistor element that can measure extremely high temperatures of approximately 1000° C. is required in a sensor for measuring a catalyst temperature, an exhaust system temperature, or the like that is disposed in the periphery of an automobile engine. A thermistor element generally includes a metal-oxide sintered body (for example, a perovskite Y $(Cr,Mn)O_3$) and a Pt wire. Resistance to a heat cycle from room temperature to 1000° C. is imparted by insertion of two Pt wires into the a metal-oxide sintered body, and strongly fixing the Pt wires by sintering using a metal oxide.

Consequently, the Pt wire must be inserted prior to sintering of the metal oxide, and the metal oxide and the Pt wire must be fired at the same time. Since heat resistance properties to 1000° C. are required, the metal oxide should preferably have a sintering temperature of at least 1400° C., and for that reason, Pt wire that is stable at a temperature of at least 1400° C. is used in the electrode.

Conventionally, as disclosed in Patent Literature 1, a method of manufacturing a high-temperature thermistor that embeds Pt wire includes a powder-press method that applies a pressing operation to the metal wire at the same time as a granulated ceramic powder.

CITATION LIST

Patent Literature

[Patent Literature 1] Japanese Patent No. 4024612

DISCLOSURE OF THE INVENTION

Problem to be Solved by the Invention

The following problems remain unsolved in relation to the conventional technique.

When using a thermistor element, deviations in the resistance value must be suppressed in order to avoid errors in temperature detection. A principal cause of such deviation includes a deviation in the contact surface area between the element (sintered body) and the electrode (Pt wire), and length of the electrode (Pt wire). In particular, deviation in the contact surface area of the former, that is to say, a deviation in the amount of granulated powder, causes a severe deviation in the resistance value.

In recent years, there has been a need for downsizing of a thermistor element due to demand for improved sensor response characteristics. For example, the size of the element (sintered body) should be of the order of 2 mm diameter×1 mm thickness, and the amount of granulated powder used in this context should be of the order of several mg. In this case, when a method of filling a die by measuring a fixed amount of powder is used, efficient and highly accurate measurement is problematic due the extremely small quantity that is measured. For example, when using 10 mg of granulated powder, a measurement accuracy of 0.1 mg is required in order to suppress deviation in the resistance value to 1%. It is extremely difficult for example to perform an efficient and highly-accurate measurement using a scale, and then efficiently place, without spillage, the measured powder into a die having an opening of 2 mm.

Furthermore, when using a method in which a fixed amount of powder placed in a die is obtained by leveling, the amount of powder varies as a result of deviation in the filling state of the powder, and there is disadvantage of variation in the thickness after pressing.

During removal from the die press, there is a risk of damage of cracking of the green molded body, or the like due to application of a force to the metal wire as a result of the metal wire catching on the die. Even when cracking cannot be detected on external examination, a crack may form after firing.

In addition, when filling of powder into the die is not sufficient, deformation of the Pt wire may occur during the pressing operation, and therefore problems arise that are caused by a deviation in the resistance value due to entry of powder into the Pt wire insertion portion of the press die (burr formation).

Furthermore, as shown in FIG. 6, the thermistor element prepared using a powder press method may produce a large warping as a result of bending of the outer periphery of the sintered body 1, and may produce a break 1*a* in the insertion mouth for the lead wire 2 that is a Pt wire. The dimensions of the break 1*a* also are a cause of a deviation in the resistance value.

In other words, since the powder and the lead wire 2 are pressed simultaneously, there is close attachment between the powder and the lead wire 2. Consequently it may be the case that a large warping in the sintered body 1 results from inhibition of the contraction of the thermistor powder of the lead wire connection during sintering.

Since a clearance for extraction is provided in proximity to the insertion mouth of the lead wire 2 between the lead wire 2 and the press die, insufficient pressure is applied in proximity to the insertion mouth of the lead wire 2. Consequently, when sintering is performed in this configuration, a break 1*a* is produced in proximity to the insertion mouth of the lead wire 2, and it is thought that this break 1*a* participates in the formation of the warping described above.

In this manner, in an initial state, when there is a break 1*a* in the insertion mouth and warping of the sintered body 1, since there is a difference in thermal expansion between the sintered body 1 and the lead wire 2, cracking is increased due to progressive fracture of the bond between the sintered body 1 and the lead wire 2 resulting from the heat cycle (100 repetitions between room temperature and 1000° C.). Therefore the resistance value increases, and causes insufficient reliability.

The present invention is proposed in light of the above problems, and has the object of providing a method of manufacturing a thermistor element, and a thermistor element, that inhibits production of cracks, breaks or warping, and that enables suppression of deviation in a resistance value due to high dimensional accuracy.

Means for Solving the Problem

The present invention adopts the following configuration in order to solve the above problem. In other words, the method of manufacturing a thermistor element, the thermistor element including a metal oxide sintered body for thermistor use and a plurality of lead wires connected to the metal oxide sintered body for thermistor use. The method comprises the steps of mixing and kneading a thermistor raw material powder formed from a metal oxide, an organic binder powder, and a solvent to form a clay, extrusion-molding the clay by means of a molding die to form a rod-shaped, green molded body having multiple through holes, drying the rod-shaped green molded body to form a rod-shaped dried molded body, cutting the rod-shaped dried molded body to a prescribed length to form a cut molded body having through holes, and inserting lead wires into the through holes of the cut molded body and firing to form a metal oxide sintered body for thermistor use from the cut molded body.

The method of manufacturing a thermistor element uses clay obtained by kneading a thermistor raw material powder, an organic binder powder, and a solvent to form a rod-shaped, green molded body having multiple through holes by means of a molding die, and introducing lead wires into the through holes of the cut molded body, and firing. Therefore a clearance is provided between the cut molded body and the lead wire that accounts for the shrinkage of the thermistor during sintering, and the inner diameter of the through holes is fixed. Consequently, the cut molded body and the lead wires are bonded during sintering and thereby reduce the shrinkage difference of the thermistor in the portion that is separated from the lead bonding portion and the portion in proximity to the lead wire bonding portion. For this reason, warping after firing is suppressed, a uniform and strong bond is formed between the metal oxide sintered body for thermistor use and the lead wires, and a high-temperature thermistor element can be manufactured that is resistant to a heat cycle.

Furthermore, since the same shape is obtained with highly accurate dimensions by adjustment of the cut length, deviation in the resistance value resulting from dimensional deviation can be suppressed, and more efficient manufacturing is enabled.

The method of manufacturing the thermistor element according to the present invention is characterized in that the organic binder powder is a water-soluble organic binder powder, and the solvent is water.

In other words, since the organic binder powder in this method of manufacturing the thermistor element is a water-soluble organic binder powder, in the drying step, since the clay that kneads the thermistor raw material powder, the water-soluble organic binder powder, and water can be dried more slowly than a clay in which an insoluble organic binder powder and an organic solvent such as ethanol, toluene, or the like are kneaded into the thermistor raw material powder and water, crack formation is suppressed.

The method of manufacturing the thermistor element is characterized by use of a methylcellulose water-soluble organic binder as a water-soluble organic binder powder.

In other words, since the method of manufacturing the thermistor element uses a methylcellulose water-soluble organic binder that exhibits superior compatibility with metal oxides as a water-soluble organic binder powder, a clay that is adapted for kneading with the thermistor raw material powder is obtained, and a superior rod-shaped, green molded body can be obtained by extrusion molding.

The method of manufacturing the thermistor element according to the present invention is characterized by adding at least one of a plasticizer, lubricant, wetting agent, or wax to the organic binder powder.

When strong friction is produced in the powder when extrusion molding, or when there is no wettability between the powder and the solvent such as water, smooth sliding of the extrusion surface is not obtained, surface defects are increased, and bonding characteristics of the clay are adversely affected. Consequently cracking tends to result. However in the method of manufacturing the thermistor element according to the present invention, since at least one of a plasticizer, lubricant, wetting agent, or wax is added to the organic binder powder, wettability between the powder and the solvent such as water are improved, and superior extrusion molding is enabled.

The drying step in the method of manufacturing the thermistor element according to the present invention preferably uses natural drying.

When the rod-shaped, green molded body is hot-air dried using a heater, surface irregularities caused by moisture drying tend to be produced. Consequently, cracks tend to be formed between the plurality of through holes, and serious warping occurs in the rod-shaped, green molded body, and this warping also tends to produce cracks. Such warping also hinders fixing of the molded body during subsequent cutting operations. However, since the rod-shaped, green molded body in the method of manufacturing the thermistor element according to the present invention is dried using natural drying to form a rod-shaped dried molded body, surface irregularities caused by moisture drying tend to be inhibited, and production of cracks or warping is also suppressed. "Natural drying" as used herein means drying over a long period of time at room temperature. More preferably, such drying is drying at a fixed temperature, and fixed humidity.

The method of manufacturing the thermistor element according to the present invention is characterized in that a flat surface is formed at one or more positions on an outer peripheral surface of the rod-shaped dried molded body.

In other words, in the method of manufacturing the thermistor element according to the present invention, since a flat surface is formed at one or more positions on an outer peripheral surface of the rod-shaped dried molded body, positional determination of the rod-shaped dried molded body is facilitated by the flat surface during subsequent cutting operations.

The method of manufacturing the thermistor element according to the present invention is characterized in that the diameter of the through holes of the cut molded body is larger than the diameter of the lead wire, and when firing is performed without insertion of the lead wire into the through hole, the diameter of the through hole is set to be smaller than the diameter of the lead wire.

In other words, in the method of manufacturing the thermistor element according to the present invention, the diameter of the through holes of the cut molded body is larger than the diameter of the lead wire. When firing is performed without insertion of the lead wire into the through hole, since the diameter of the through hole is set to be smaller than the diameter of the lead wire, the lead wire can be easily inserted into the through hole prior to firing, and thus a strong bond with the lead line can be formed by shrinkage of the through hole during firing.

The method of manufacturing the thermistor element according to the present invention is characterized in that, prior to firing, and before or after insertion of the lead wire into the through hole of the cut molded body, an stop portion is formed to bulge in an outer radial direction having a larger diameter than the through hole in at least one of the lead wires that protrude from the through hole.

In other words, in method of manufacturing the thermistor element according to the present invention, an stop portion is formed by a process such as caulking or the like to bulge in an outer radial direction having a larger diameter than the through hole in at least one of the lead wires that protrude from the through hole. Therefore when the cut molded body with the lead wire inserted therein is grasped and raised with the stop portion on an upper side, detachment of the lead line can be prevented by engagement of the lead wire by the stop portion. Furthermore, the protrusion amount of the lead wire can be fixed and positionally determined by the stop portion, and therefore deviation in the protrusion amount during firing can be suppressed. In this manner, when assembling the thermistor element into a sensor, electrical short circuits can be prevented. Furthermore when welding a SUS line in the sensor, variation in the welding conditions resulting from a change in the weld position can be prevented. Processing by caulking or the like in order to form the stop portion is facilitated by use of a soft Pt line as the lead wire.

The method of manufacturing the thermistor element according to the present invention is characterized in that during firing, a step is provided in which the cut molded body is set in a firing setter in a state in which the lead wires are inserted into the through holes. In this step, the cut molded body is set in the firing setter in a state in which the stop portion is oriented on an upper side and the lower side of the lead wire is inserted into a mounting hole or a mounting groove having a diameter or width that is larger than the diameter of the lead wire, and smaller than the outer diameter of the metal oxide sintered body for thermistor use after firing that is molded in the firing setter.

Since the cutting processing of the lead wire to standardize the protrusion amount of the lead wire after firing is associated with lead wire loss and an increase in the number of processing steps, during firing, it is important to fix the lead wire to a predetermined position. For example, the protrusion amount of the lead wire can be adjusted to a predetermined amount by disposing the lead wire in a horizontal orientation and forming a groove that enables fixing of the lead wire and the cut molded body to the firing setter. However, since warping of the firing setter is caused due to repetitive firing, firing that always uses the same protrusion amount may not be possible. To adapt to this situation, in the method of manufacturing the thermistor element according to the present invention, since the cut molded body is set in the firing setter in a state in which the stop portion is oriented on an upper side and the lower side of the lead wire is inserted into a mounting hole or a mounting groove having a diameter or width that is larger than the diameter of the lead wire, and smaller than the outer diameter of the metal oxide sintered body for thermistor use after firing that is molded in the firing setter, the protrusion amount of the lead wire can be predetermined and firing can be executed without reference to the warping or the like of the firing setter by suspending the lead wire in the mounting hole or the mounting groove. In this manner, processing to adjust the protrusion amount of the lead wire after firing is not required, and loss in relation to lead wire that is cut in order to arrange the length can be reduced.

The thermistor element according to the present invention is characterized by preparation using the method of manufacture for a thermistor element according to the present invention. In other words, since the thermistor element according to the present invention is prepared using the manufacturing method for a thermistor element according to the present invention, production of cracks, breaks, or warping is suppressed, and high reliability is obtained. In addition, the same shape is obtained with high dimensional accuracy, and therefore an element that exhibits highly uniform properties and low deviation in a resistance value can be produced.

Effect of the Invention

The present invention obtains the following effect.

In other words, according to the method of manufacturing the thermistor element according to the present invention, a thermistor raw material powder, an organic binder powder, and a solvent are mixed and kneaded to form clay that is extrusion-molded by means of a molding die to form a rod-shaped, green molded body. Then lead wires are inserted into the through holes of the cut molded body and fired. Thus, warping after firing is suppressed, a uniform and strong bond is formed between the metal oxide sintered body for thermistor use and the lead wires, thereby enabling manufacture of a high-temperature thermistor element that is resistant to a heat cycle. Furthermore, since the same shape is obtained with highly accurate dimensions by adjustment of the cut length, deviation in the resistance value resulting from dimensional deviations can be suppressed, and more efficient manufacturing is enabled. Therefore, a thermistor element prepared according to this method of manufacturing suppresses production of cracks, breaks, or warping, and high reliability is obtained. In addition, the same shape is obtained with high dimensional accuracy, and therefore an element that exhibits highly uniform properties and low deviation in a resistance value can be produced. In particular, application is suitable in relation to high-temperature measurement sensors for a catalyst temperature or exhaust gas temperature in proximity to an automobile engine.

BRIEF DESCRIPTION OF THE DRAWINGS

FIG. 3 is a side sectional view and a front view showing a rod-shaped, green molded body according to the first embodiment.

FIG. 4 is a side sectional view and a front view showing a cut molded body with lead wires inserted therein according to the first embodiment.

BEST MODE FOR CARRYING OUT THE INVENTION

Hereafter a first embodiment of a manufacturing method for the thermistor element, and the thermistor element according to the present invention will be described making reference to FIG. 1 to FIG. 5.

Figure 1:
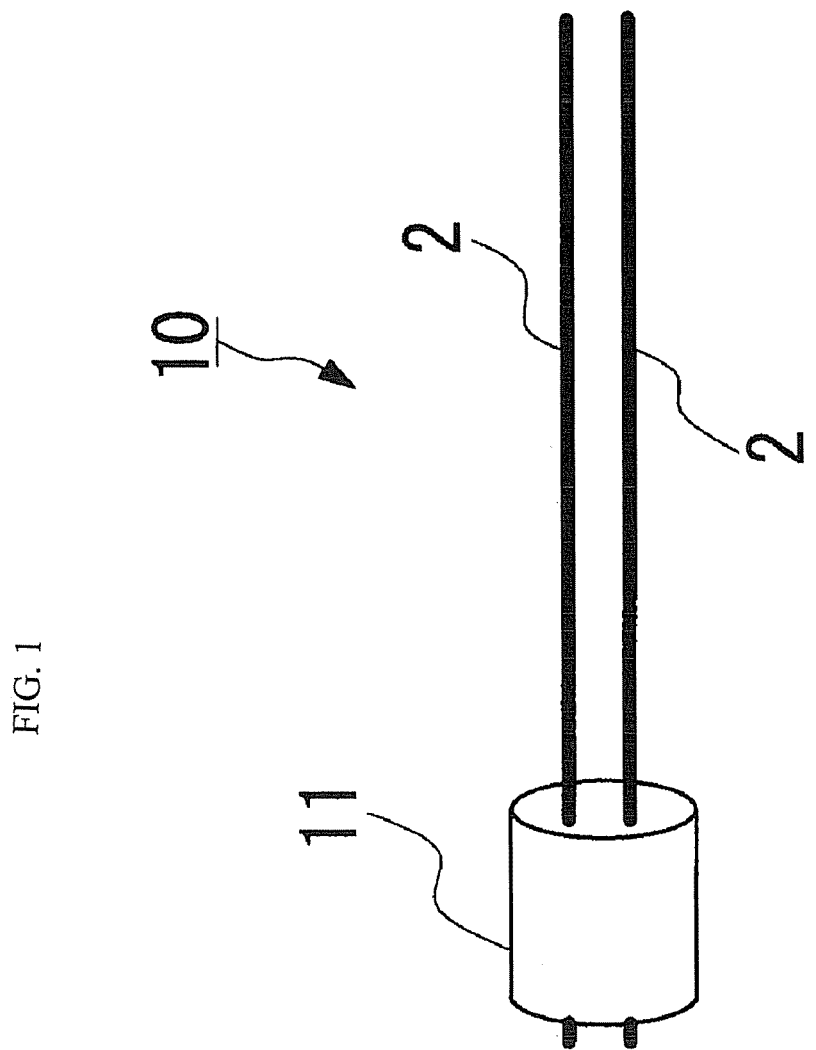
FIG. 1 is a perspective view of a thermistor element according to a first embodiment of a thermistor element and the manufacturing method for a thermistor element according to the present invention.

As shown in FIG. 1, the manufacturing method for the thermistor element according to the present invention is a manufacturing method for a thermistor element 10 that includes a metal oxide sintered body for thermistor use 11, and a pair of lead wires 2 connected to the metal oxide sintered body for thermistor use 11.

The metal oxide sintered body 11 for thermistor use is a sintered mixture of an insulating material added to a perovskite oxide. For example, the sintered body is configured by inclusion of a complex oxide expressed by the general formula: $1-w\ (La_{1-z}Y_z)_{1-y}A_y(Cr_{1-x}Mn_x)O_3 + wY_2O_3$ (where A=Ca, Sr $0.0 \leq x \leq 1.0$, $0.0 \leq y \leq 1.0$, $0.0 \leq z \leq 1.0$, $0 \leq w \leq 0.9$).

The constant B is a parameter expressing the electrical characteristics of the thermistor element 10, and is adjusted by varying the values for x, y, z in $(Y_{1-z}La_z)_{1-y}A_y(Cr_{1-x},Mn_x)O_3$. For example, when the constant B is reduced, the resistance value is also reduced, and therefore when adjustment of the resistance by varying the shape is not possible, the resistance value must be increased by mixing and sintering of an insulation material. In the present embodiment, although the insulating material is $Y_2O_3$, the material may be varied to another insulating material such as $ZrO_2$, $MgO$, $Al_2O_3$, $CeO_2$.

Firstly, an $La_2O_3$ powder is heated to 1000° C. for 2 hours, dried, and the residual hydroxide is reconstituted as $La_2O_3$. The blending of the $La_2O_3$ raw material is performed with materials within 2-3 hours after heating, or materials remaining in a drying box 2-3 days after heating.

Next, each of the $La_2O_3$, $Y_2O_3$, $CaCO_3$, $SrCO_3$, $Cr_2O_3$, and $MnO_2$ powder is weighed, and placed in a ball mill, a Zr ball and a suitable amount of ethanol is added, and mixing is performed for 24 hours. The mixture is removed, dried, and then fired at 1300° C. for 5 hours, to thereby obtain, for example, a calcinated powder having a general formula of $(La_{0.5}Y_{0.5})(Cr_{0.6}Mn_{0.4})O_3$ in which x=0.4, y=0, and z=0.5.

The calcinated powder is weighed with new $Y_2O_3$ powder, a sintering aid $CaCO_3$ is added, and the mixture is pulverized in the ball mill using the Zr ball and ethanol. Furthermore, when mixing the calcinated powder, $Y_2O_3$ and $CaCO_3$, in the event that residual La exists in isolation in the calcinated powder, pure water may be used to for mixing and pulverization. The mixing time is 24 hours, followed by drying to thereby form the thermistor raw material.

Next, the thermistor raw material powder formed from a metal oxide, an organic binder powder, and a solvent are mixed and kneaded to form a clay.

The organic binder powder is a binder generally used in extrusion molding, and has a high viscosity in a low-concentration aqueous solution. In particular, a water-soluble organic binder powder is preferred, and for example, includes methylcellulose (normally denoted as MC), ethylcellulose (EC), polyvinyl alcohol (PVA), polyethylene glycol (PEG), polyethylene oxide (PEO), or the like. Water is used as the solvent.

Of the above compounds, in particular, methylcellulose finds wide application. For example, carboxymethyl cellulose (CMC), hydroxybutylmethyl cellulose (HBMC), hydroxpropylmethyl cellulose (HPMC) may be used.

In addition, ethylcellulose includes use of ethylhydroxy ethyl cellulose (EHEC).

Furthermore, at least one of a plasticizer, lubricant, wetting agent, or wax may be added to the organic binder powder.

In the present embodiment, for example, methylcellulose (MC) is used as a water-soluble organic binder powder, and pure water and an additive such as a plasticizer, lubricant, wetting agent, or the like is added to the powder and mixed in a mixer to thereby form a wet powder containing a water-soluble organic binder. In addition, a deflocculant, dispersing agent, moisture retaining agent, surface active agent, hardening agent, or the like may be added as a molding aid.

The wet powder containing a water-soluble organic binder is mixed and kneaded using a screw of a raw material kneading apparatus to thereby form a viscous clay. The kneading operation is repeated to ensure sufficient mixing and kneading.

Figure 2:
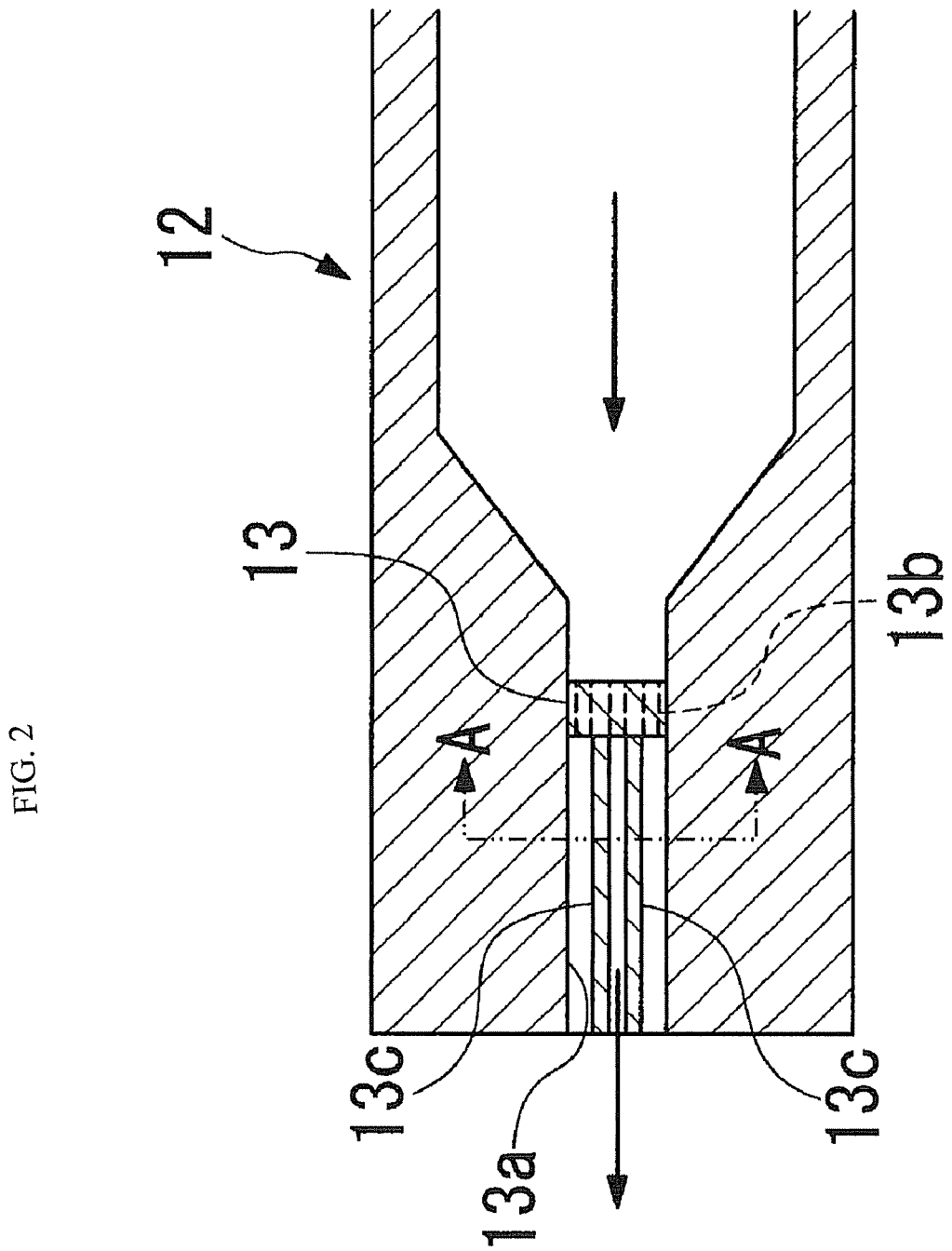
FIG. 2 is a simplified sectional view of an extrusion molding apparatus using a molding die according to the first embodiment.

Next, as shown in FIG. 2, the clay is placed into an extrusion molding apparatus 12, and mixed and kneaded using the screw (omitted from the figure) while vacuum processing. Entry of air bubbles into the molded body is prevented by vacuum processing while kneading. When sufficient mixing and kneading is not performed, stability and accuracy of the extrusion molding are adversely affected. Furthermore, the clay when pressed and drawn out by the screw, passes through the molding die 13 to thereby undergo extrusion molding, and form a rod-shaped green molded body 15 having a pair of through holes 14 as shown in FIG. 3.

The extrusion molding apparatus 12 has a structure that enables extrusion molding of a mixed and kneaded material under vacuum processing without further modification. Furthermore, as shown in FIG. 2, the molding die 13 is a two-hole molding die, and includes a plurality of extrusion holes 13b for extrusion of the clay into a hollow columnar die 13a and a pair of parallel nostril-like round portions 13c extending along the axial line in the die 13a to thereby form the pair of through holes 14.

A rod-shaped, green molded body 15 is formed, for example, with a diameter of 2.0 mm and a diameter (nostril diameter) in the through holes 14 of 0.34 mm by passing the clay through the molding die 13.

When performing the extrusion molding as described above, it is important that the extrusion molding pressure is held constant, and the extrusion molding speed is held constant. When the amount of water-soluble organic binder powder and water is not suitable, cracks may form in the rod-shaped, green molded body 15. For example, when the moisture amount is excessively large, or excessively small, extrusion molding cannot be performed, and the molded body may not exit the molding die 13. Furthermore, even in the event that the molded body comes out of the die, a shape change such as a deviation in the diameter may occur, and after firing, such deviations may cause deviation in the resistance value of the thermistor element 10.

Next, after extrusion molding, the rod-shaped, green molded body 15 is naturally dried in order to suppress warping due to shrinkage during drying operations.

Natural drying is preferred to drying moisture from the rod-shaped, green molded body 15. When hot-air drying is performed using a heater, surface irregularities caused by moisture drying tend to be produced, and cracks tend to be formed between the pair of through holes 14. Furthermore, natural drying has the further purpose of preventing serious warping from occurring in the rod-shaped, green molded body 15, and cracks that are produced by this warping. Such warping hinders fixing of the rod-shaped, green molded body 15 during subsequent cutting operations.

Optimal drying conditions such as slow drying of the rod-shaped, green molded body 15 in a box at a fixed temperature and fixed humidity over 1-2 days are preferred.

When drying moisture, the rod-shaped, green molded body 15 undergoes shrinkage as moisture is lost. The outer peripheral diameter of the rod-shaped, green molded body 15 and the diameter of the through hole 14 (nostril diameter) undergo common shrinkage. The molding die 13 must be designed to take in account shrinkage resulting from moisture loss.

Next, the rod-shaped dried molded body is cut to a predetermined length to form a cut molded body 16 having nostril-shaped through holes 14.

In other words, the rod-shaped dried molded body is fixed, and cut by dicing.

For example, the rod-shaped dried molded body is cut every 1.00 mm with an accuracy of 1.00±0.02 mm. Cutting at this accuracy suppresses initial error in the resistance value after firing to within 2%.

The method of cutting may be press cutting. However, when the rod-shaped dried molded body has a fairly high level of hardness, the blade may be chipped during cutting, and therefore when using press cutting, the hardness of the rod-shaped dried molded body must be reduced.

As shown in FIG. 4, a round bar-shaped lead wire 2 is inserted into and passed through the pair of through holes 14 of the cut body 16.

The lead wire 2 is a metal wire having a high melting point of at least 1400° C., and includes a Pt wire, a wire containing Rh in Pt, a wire containing Ir in Pt, or the like.

Next, the cut molded body 16 with the lead wire 2 inserted into the through holes 14 is processed to remove the binder, and then fired at approximately 1500° C. to form a metal oxide sintered body 11 for thermistor use to thereby prepare the thermistor element 10.

The diameter of the through holes 14 of the rod-shaped green molded body 15 is set to be larger than the diameter of the lead wire 2 in view of insertion characteristics when the rod-shaped dried molded body is formed by drying.

The diameter of the through hole 14 of the rod-shaped, green molded body and the cut molded body 16 is set to be smaller after firing than the diameter of the lead wire 2 to thereby take into account shrinkage during sintering.

The shrinkage ratio due to sintering is defined by subtracting the through-hole diameter after firing without insertion of the lead wire into the through hole from the through-hole diameter of the cut molded body 16, and then dividing the resulting value by the through-hole diameter of the cut molded body 16. The assumed amount of biting into the lead wire is defined as $\Delta L$ (mm). $\Delta L$ is defined as shown below.

$$\Delta L = \text{lead wire diameter(mm)} - (1-\text{shrinkage ratio}) \times \text{through-hole diameter of cut molded body(mm)}$$

Figure 5:
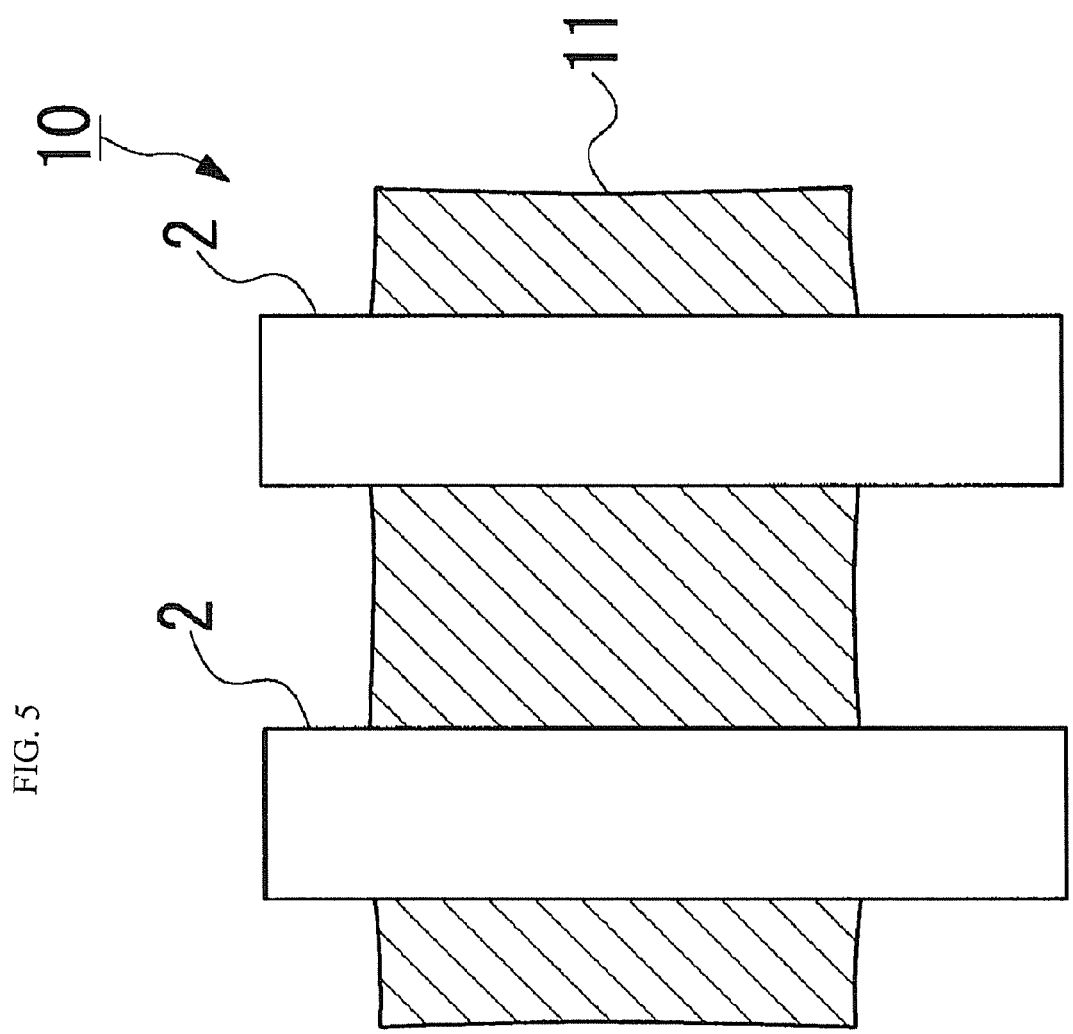
FIG. 5 is a sectional view showing the thermistor element according to the first embodiment.
Figure 6:
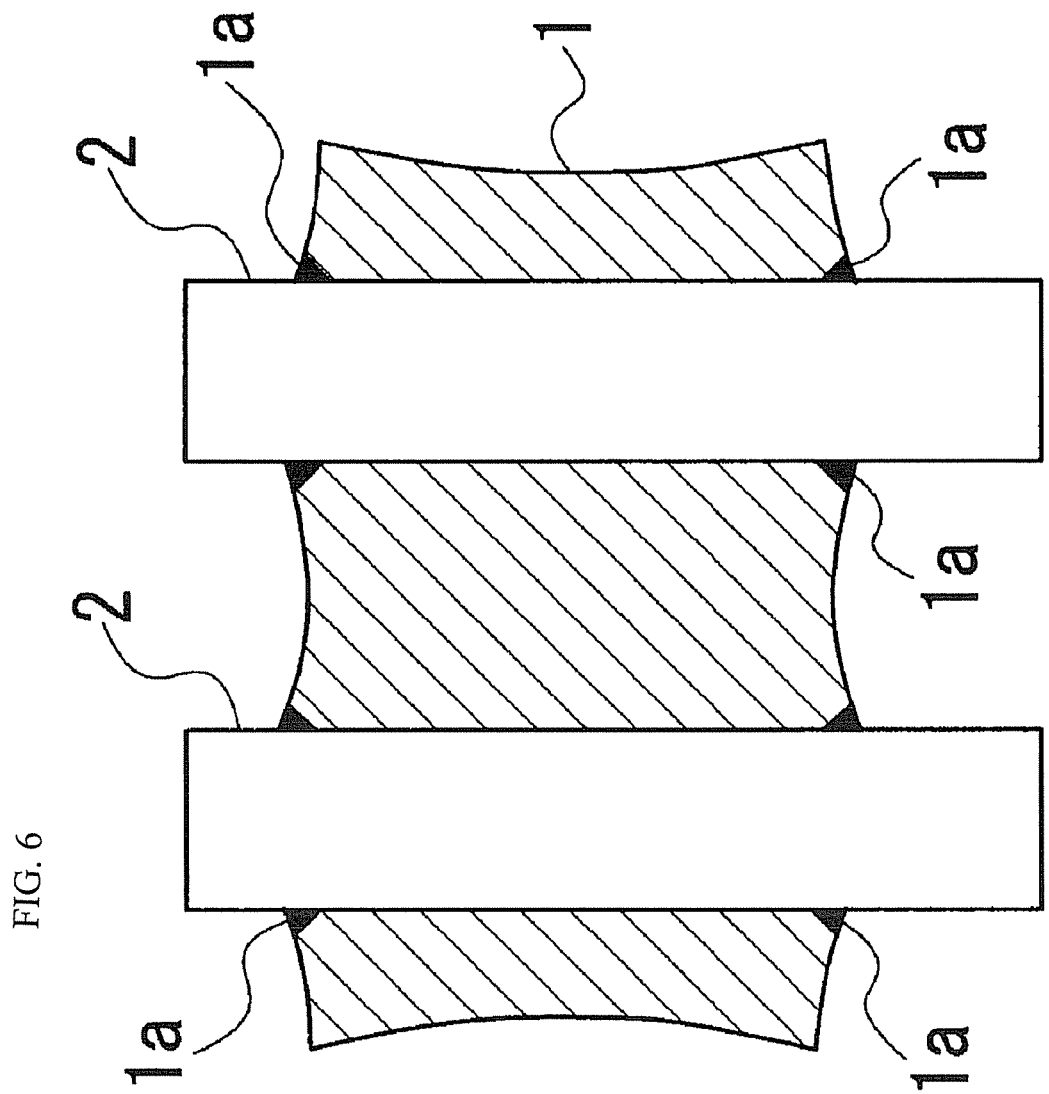
FIG. 6 is a sectional view of the thermistor element according to a conventional example of a thermistor element (powder pressed product) and the manufacturing method for a thermistor element according to the present invention.

In the manufacturing method for a thermistor element according to the present embodiment, a thermistor raw material powder, an organic binder powder, and water (a solvent) are mixed and kneaded to form a clay that is extrusion-molded by means of a molding die 13 to form a rod-shaped, green molded body 15. Lead wires 2 are inserted into the through holes 14 of the cut molded body 16 and firing is performed. Therefore since a clearance can be provided between the cut molded body 16 and the lead wire 2 that accounts for the shrinkage of the thermistor during sintering, and the inner diameter of the through holes 14 is fixed, the cut molded body 16 and the lead wires 2 are bonded during sintering to thereby almost completely avoid a shrinkage difference in proximity to the bonding portion of the lead wire 2. For this reason, as shown in FIG. 5, after firing, warping and breaks 1a are suppressed, a uniform and strong bond is formed between the metal oxide sintered body 11 for thermistor use and the lead wire 2, and a high-temperature thermistor element can be manufactured that is resistant to a heat cycle.

Furthermore, since the same shape is obtained with highly accurate dimensions by adjustment of the cut length of the cut molded body 16, deviation in the resistance value resulting from dimensional deviation can be suppressed, and more efficient manufacturing is enabled.

The organic binder powder is a water-soluble organic binder powder, and the solvent is water. Therefore in the drying step, the thermistor raw material powder, the water-soluble organic binder powder, and water are kneaded to form a clay which is dried more slowly than a clay in which an insoluble organic binder powder and an organic solvent such as ethanol, toluene, or the like are kneaded into the thermistor raw material powder and water. Consequently, crack formation is suppressed.

In particular, since a methylcellulose (MC) organic binder that exhibits superior compatibility with metal oxides is used as the water-soluble organic binder powder, a clay that is adapted for kneading with the thermistor raw material powder is obtained, and a superior rod-shaped, green molded body can be obtained by extrusion molding.

Since at least one of a plasticizer, lubricant, wetting agent, or wax is added to the organic binder powder, wettability between the powder and the solvent (water) are improved and thereby enable superior extrusion molding.

Furthermore since the rod-shaped green molded body 15 is naturally dried to form rod-shaped dried molded body, surface irregularities caused by drying of moisture tend not to occur, and production of cracking or warping is suppressed.

The diameter of the through holes 14 of the cut molded body 16 is set to be larger than the diameter of the lead wire 2 in view of insertion characteristics when the rod-shaped dried molded body is formed by drying. The diameter of the through holes 14 of the cut molded body 16 is set to be smaller after firing than the diameter of the lead wire 2 in view of bonding due to shrinkage during sintering. Consequently, the metal oxide sintered body 11 for thermistor use and the lead wire 2 can be bonded to thereby prepare a thermistor element 10.

Next, a second embodiment of a manufacturing method for a thermistor element according to the present invention, and a thermistor element will be described hereafter making reference to FIG. 7 to FIG. 9. In the description of the following embodiment, the same reference numerals denote the same features of configuration as described in the embodiment above, and such description will not be repeated.

Figure 7:
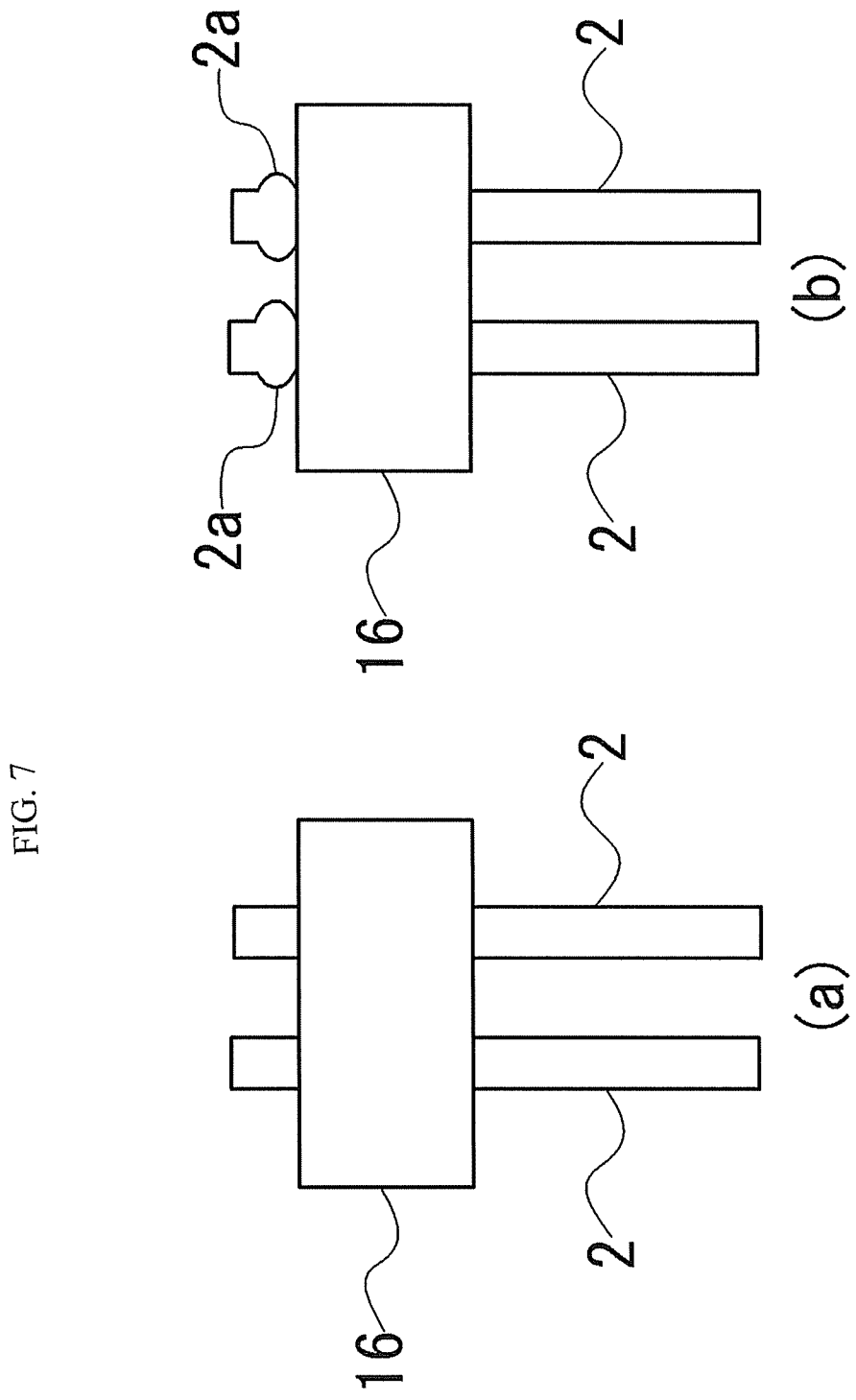
FIG. 7 is a sectional view before and after a caulking process when the lead wires are inserted into a cut molded body according to a second embodiment of the thermistor element and the manufacturing method for the thermistor element according to the present invention.
Figure 8:
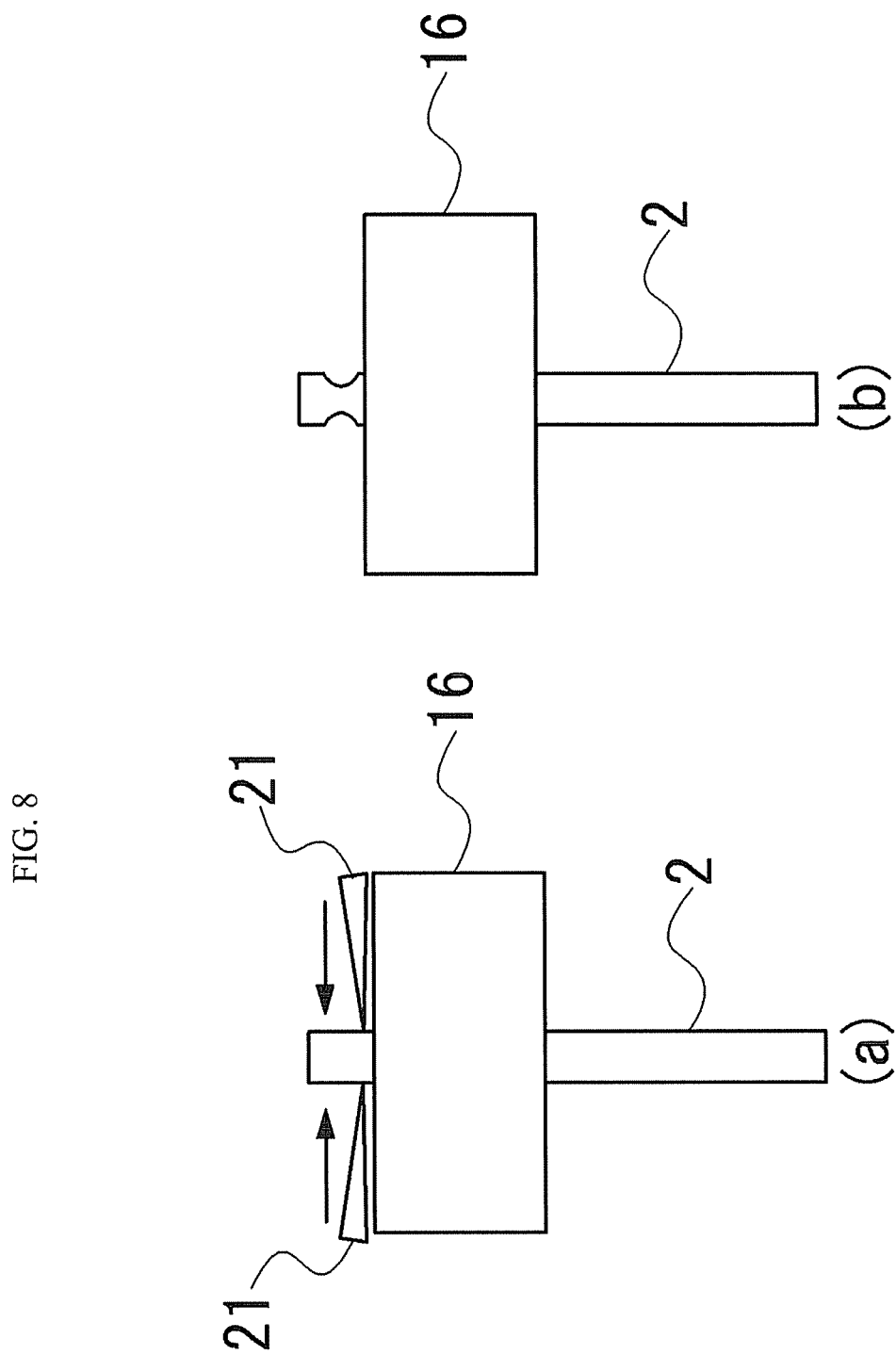
FIG. 8 is an upper surface view before and after a caulking process when the lead wires are inserted into a cut molded body according to the second embodiment.
Figure 9:
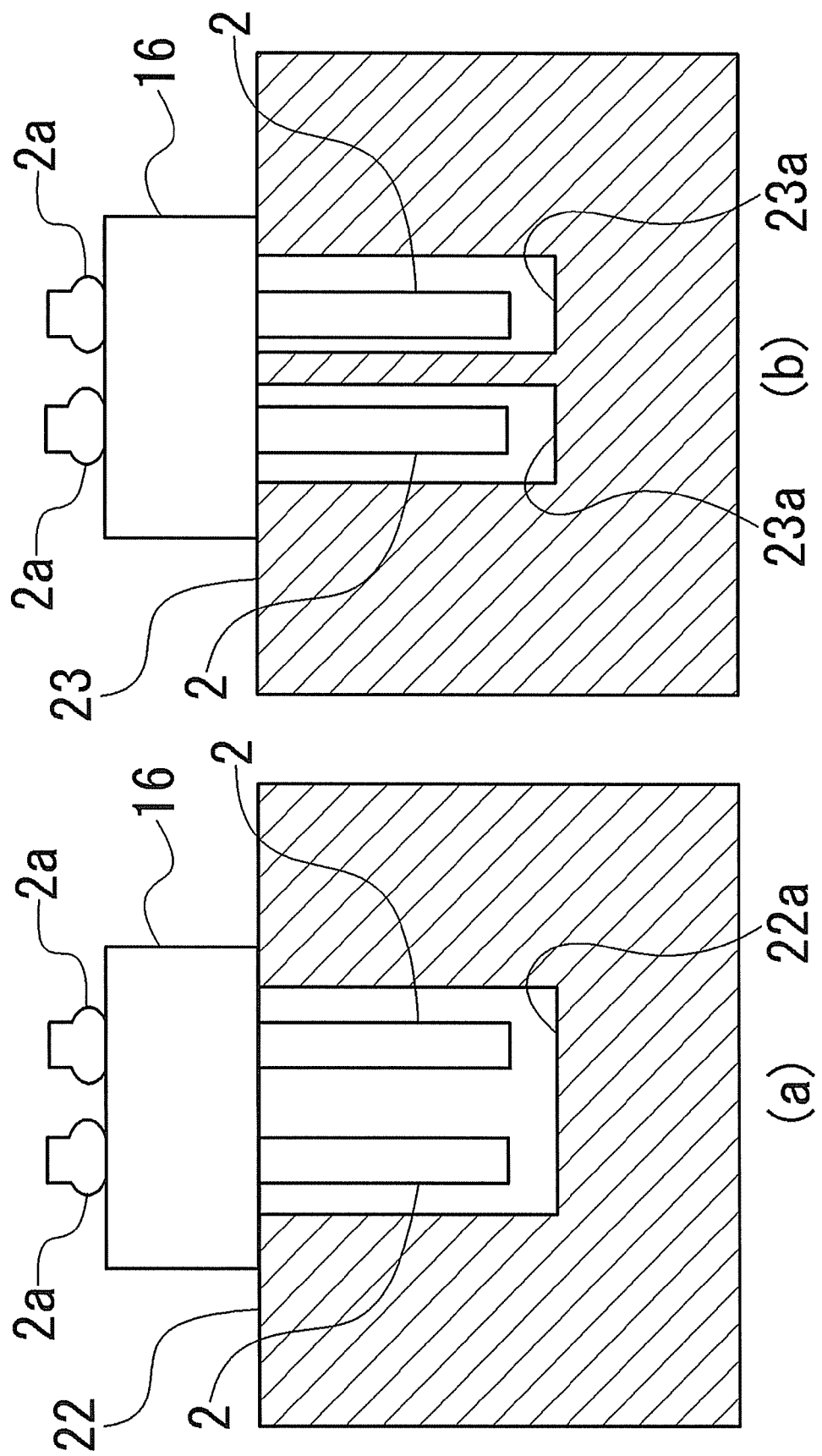
FIG. 9 is a sectional view showing the mounting of the cut molded body with the lead wires inserted into the cut molded body in a firing setter with partitions and a firing setter without partitions according to the second embodiment.

The point of difference between the second embodiment and the first embodiment is that, as shown in FIG. 7 and FIG. 8, in the second embodiment, prior to firing and before or after insertion of the lead wire 2 into the through hole 14 of the cut molded body 16, an stop portion 2a is formed to bulge in an outer radial direction having a larger diameter than the through hole 2 in at least one of the lead wires 2 that protrude from the through hole 14. This configuration is in contrast to the first embodiment in which the cut molded body 16 is fired having straight bar-shaped lead wires 2 inserted therein.

In other words, in the second embodiment, prior to insertion of the lead wire 2 into the through hole 14, the stop portion 2a is formed by a caulking process to bulge in an outer radial direction having a larger diameter than the through hole 2 in at least one of the lead wires 2 that protrude from the through hole 14. The lead wire 2 is inserted into the through hole 2 from the end portion on which the stop portion 2a is not formed.

Furthermore, after inserting the lead wire 2 into the through hole 14, the stop portion 2a is formed by caulking processing to bulge in an outer radial direction having a larger diameter than the through hole 2 in one or both of the lead wires 2 that protrude from the through hole 14.

As shown in FIGS. 8(a) and 8(b), the formation of the stop portion 2a is performed by use of a blade 21 from both sides at a predetermined position of the lead wire 2 to thereby execute localized pressing by sandwiching the side portions, and as shown in FIG. 7(b), the stop portion 2a is formed by bulging in a direction that is orthogonal to the pressing direction.

A minimal protrusion amount of the lead wire 2 is preferred. For example, a protrusion amount within 0.3 mm relative to the cut molded body 16 that has a thickness of 1.0 mm is preferred. In this manner, the metal oxide sintered body 11 for thermistor use can be attached without causing an electrical short circuit from the distal end of the sensor.

Furthermore, in the second embodiment as shown in FIG. 9(a), during firing, there is a processing step of setting the cut molded body 16 in the firing setter 22 in a state in which the lead wire 2 is inserted into the through hole 14. In this processing step, the cut molded body 16 is set in the firing setter 22 in a state in which the stop portion 2a is oriented on an upper side and the lower side of the lead wire is inserted into a mounting groove 22a having a width that is smaller than the outer diameter of the metal oxide sintered body 11 for thermistor use that is formed in the firing setter 22, and into which a pair of lead wires 2 can be inserted.

The size of the mounting groove 22a takes into account shrinkage during sintering, and is set to be smaller than the outer diameter of the sintered body, and larger than the diameter of the lead wire 2 to thereby enable insertion of the lead wire 2. As shown in FIG. 9, the mounting groove 22 may be set to a size that is smaller than the outer diameter of the metal oxide sintered body 11 for thermistor use even when the size of the mounting groove 22a is adjusted so that a pair of lead wires 2 is aligned in relation to the direction of the slit (groove). The reason for this setting is that there is the possibility of detachment of the lead wire 2 and falling of the cut molded body 16 into the mounting groove 22 in the event the size of the mounting groove 22 is set to be larger than the outer diameter of the metal oxide sintered body 11 for thermistor use.

The firing setter 22 is formed, for example, from alumina. The mounting groove 22a is formed in a slit shape enabling an aligned mounting of a plurality of cut molded bodies 16.

In the second embodiment, an stop portion 2a is formed by a process such as caulking or the like to bulge in an outer radial direction having a larger diameter than the through hole 14 in at least one of the lead wires 2 that protrude from the through hole 14. Thus, when the cut molded body 16 with the lead wire 2 inserted is grasped and raised with the stop portion 2a on an upper side, detachment of the lead line 2 can be prevented by engagement of the lead wire 2 with the stop portion 2a. Furthermore, the protrusion amount of the lead wire 2 can be fixed and positionally determined by the stop portion 2a, and therefore deviation in the protrusion amount during firing can be suppressed.

In this manner, when assembling the thermistor element into a sensor, electrical short circuiting can be prevented. Furthermore when welding a SUS line in the sensor, variation in the welding conditions resulting from a change in the weld position can be prevented. The caulking process or the like used to form the stop portion 2a is facilitated by use of a soft Pt wire as the lead wire 2.

Since the cut molded body 16 is set in the firing setter 22 in a state in which the stop portion 2a is oriented on an upper side and the lower side of the lead wire 2 is inserted into a mounting groove 22a having a width that is smaller than the outer diameter of the metal oxide sintered body 22 for thermistor use after firing that is molded in the firing setter 22, the protrusion amount of the lead wires can be predetermined and firing can be executed without reference to the warping or the like of the firing setter 22 by suspending the lead wire 2 in the mounting groove 22a. In this manner, a process step for adjustment of the protrusion amount of the lead wires 2 after firing is not required, and loss in relation to lead wire 2 that is cut in order to arrange the length can be reduced.

Although there is no partition between the pair of inserted lead wires 2 in the mounting groove 22a of the firing setter 22, as shown in FIG. 9(b), a configuration may be used in which the firing setter 23 includes a mounting hole 23a provided in a partition between the pair of lead wires 2. The firing setter 23 may be configured as a hollow firing setter 23 that employs a honeycomb ceramic, or the like.

In substitution for a slit-shaped groove, a round groove may be used that has a larger diameter enabling insertion of a pair of lead wires 2.

Working Example 1

A thermistor element actually manufactured using the method of manufacture for a thermistor element according to the first embodiment exhibited the following evaluation results.

Firstly, the thermistor element after firing was subjected to heat resistance testing at 1000° C. for 100 h. The results of the heat resistance testing confirmed that the working example of the present invention exhibited a variation ratio in the electrical resistance ratio of within 1%, similar to powder pressed products.

Furthermore, the thermistor element after firing was examined by a heat cycle test (HCT) for the presence of a 2% increase in the resistance value due to crack formation.

The condition used in the heat cycle test (HCT) was 100 cycles alternating between room temperature and 1000° C. A Pt wire (lead wire 2) (substantially 1 mm length) having a diameter of 0.20-0.31 mm was inserted into a rod-shaped dried molded body of 1.85 mm diameter×1.0 mm thickness and having a through hole 14 (nostril diameter) of 0.32 mm diameter. The results are shown in Table 1.

TABLE 1

| Pt wire diameter (mm) | Though-hole - Pt wire clearance (mm) | | ΔL (mm) | Presence of increase in resistance value after heat cycle | 3σ/μ (%) |
|---|---|---|---|---|---|
| 0.32 | less than 0.003 mm | Insertion Pt wire not possible | 0.06 | — | — |
| 0.31 | 0.01 | | 0.05 | 0/50 | 1-2 |
| 0.30 | 0.02 | | 0.04 | 0/50 | 1-2 |
| 0.27 | 0.05 | | 0.01 | 45/50 | 1-2 |

TABLE 1-continued

| Pt wire diameter (mm) | Through-hole - Pt wire clearance (mm) | | ΔL (mm) | Presence of increase in resistance value after heat cycle | 3σ/μ (%) |
|---|---|---|---|---|---|
| 0.25 | 0.07 | After firing, weak Pt wire bonding | −0.009 | 50/50 | — |
| 0.20 | 0.12 | After firing, extreme weak Pt wire bonding | −0.06 | — | — |
| powder press, Pt wire diameter 0.30 mm | 0 | | — | 20/50 | 8-10 |

As a result, no configuration in which a 0.30, 0.31 mm diameter Pt wire (lead wire 2) was inserted exhibited an increase in the resistance value. Many of the configurations with an inserted Pt wire having a diameter of 0.27 mm or less were samples exhibiting an increase in the resistance value after the heat cycle. Furthermore bonding with the Pt wire (lead wire 2) after firing in configurations with an inserted Pt wire having a diameter of 0.25 mm or less was extremely weak, and after application of the heat cycle, all configurations exhibited an increase in the resistance value. In the comparative example, a thermistor element obtained by a powder pressing method included a sample in which the resistance value increased after the heat cycle.

The shrinkage ratio due to sintering of the thermistor element according to the above working example was 19%. When the value for ΔL was at least 0.04 mm, an increase in the resistance value due to the heat cycle was suppressed.

Deviation in the resistance value in the rod was examined. The results are shown in Table 1. A deviation of 3σ/μ in the resistance value of the thermistor element obtained in the present working example was 1-2%. σ denotes the standard deviation of the resistance value in the rod, and μ denotes the average value of the resistance value in the rod. Deviation in sectional dimensions is suppressed to within 1-2%, and, as a result, operation is enabled by suppressing the resistance value deviation.

On the other hand, in the comparative example, 3σ/μg resulting from a powder press method was 8-10%. Although the weighed amount of raw material was suppressed to within 1%, the deviation in the resistance value in the rod was increased due to reasons including a deviation in the filled state of powder during pressing operations, burr formation, or insufficient pressing pressure in proximity to the lead wire. There are difficulties in avoiding these reasons during manufacturing processes.

The technical scope of the present invention is not limited to the embodiments and working examples described above, and various modifications may be added within a scope that does not depart from the spirit of the invention.

Although the shape of the rod-shaped dried molded body was columnar, a flat surface may be formed in at least one position on an outer peripheral surface of the rod-shaped dried molded body. For example, when executing extrusion molding, the inner die shape may be set so that a flat surface is formed on an outer peripheral surface of the rod-shaped green molded body. In this manner, positional determination of the rod-shaped dried molded body is facilitated by the flat surface during subsequent cutting operations as a result of forming a flat surface on an outer peripheral surface of the rod-shaped dried molded body.

DESCRIPTION OF THE REFERENCE NUMERALS

| | |
|---|---|
| 2 | LEAD WIRE |
| 2a | STOP PORTION |
| 10 | THERMISTOR ELEMENT |
| 11 | METAL OXIDE SINTERED BODY FOR THERMISTOR USE |
| 13 | MOLDING DIE |
| 14 | THROUGH HOLE |
| 15 | ROD-SHAPED GREEN MOLDED BODY |
| 16 | CUT MOLDED BODY |
| 22, 23 | FIRING SETTER |
| 22a | MOUNTING GROOVE |
| 23a | MOUNTING HOLE |

The invention claimed is:

1. A method of manufacturing a thermistor element, the thermistor element including a metal oxide sintered body for thermistor use and a plurality of lead wires connected to the metal oxide sintered body for thermistor use, the method comprising the steps of:
   mixing and kneading a thermistor raw material powder formed from a metal oxide, an organic binder powder, and a solvent to form a clay,
   executing extrusion-molding of the clay by means of a molding die to form a rod-shaped, green molded body having multiple through holes,
   drying the rod-shaped green molded body to form a rod-shaped dried molded body,
   cutting the rod-shaped dried molded body to a prescribed length to form a cut molded body having through holes, and
   forming a stop portion at a location on at least one of the lead wires, which protrude from the through hole, in contact with the cut molded body before or after insertion of the lead wires into the through holes of the cut molded body, and firing that configuration to form the cut molded body into a metal oxide sintered body for thermistor use.

2. The method of manufacturing a thermistor element according to claim 1 wherein the organic binder powder is a water-soluble organic binder powder, and the solvent is water.

3. The method of manufacturing a thermistor element according to claim 2 wherein a methylcellulose water-soluble organic binder powder is used as the water-soluble organic binder powder.

4. The method of manufacturing a thermistor element according to claim 1 wherein at least one of a plasticizer, lubricant, wetting agent, or wax is added to the organic binder powder.

5. The method of manufacturing a thermistor element according to claim 1 wherein the drying is natural drying.

6. The method of manufacturing a thermistor element according to claim 1, wherein a flat surface is formed at least at one position on an outer peripheral surface of the rod-shaped dried molded body.

7. The method of manufacturing a thermistor element according to claim 1 wherein the diameter of the through holes of the cut molded body is larger than the diameter of the lead wire, and when firing is performed without insertion of the lead wire into the through hole, the diameter of the through hole is set to be smaller than the diameter of the lead wire.

8. The method of manufacturing a thermistor element according to claim 1 or claim 7 wherein, the stop portion is formed to bulge in an outer radial direction having a larger diameter than the through hole.

9. The method of manufacturing a thermistor element according to claim 8 wherein during firing, a step is provided in which the cut molded body is set in a firing setter in a state in which the lead wires are inserted into the through holes, and in this step, the cut molded body is set in the firing setter in a state in which the stop portion is oriented on an upper side and the lower side of the lead wire is inserted into a mounting hole or a mounting groove having a diameter or width that is larger than the diameter of the lead wire, and smaller than the outer diameter of the metal oxide sintered body for thermistor use after firing that is molded in the firing setter.

* * * * *